United States Patent Office 3,708,454
Patented Jan. 2, 1973

3,708,454
THERMAL STABILIZATION OF POLYSULFONE POLYMERS
Joel William Barlow, Piscataway, Raymond George Azrak, Whitehouse, and Lloyd Mahlon Robeson, Lebanon, N.J., assignors to Union Carbide Corporation, New York, N.Y.
No Drawing. Filed May 6, 1971, Ser. No. 141,041
Int. Cl. C08g 45/56
U.S. Cl. 260—37 R                 15 Claims

ABSTRACT OF THE DISCLOSURE

Polyarylene polyether polysulfone thermoplastic polymers are stabilized by the addition of non-hydrolyzable divalent metallic oxides and sulfides.

---

This invention relates to the thermal stabilization of linear thermoplastic polyarylene polyether polysulfone polymers and particularly to the stabilization of composite polymers incorporating asbestos fiber.

Polysulfone polymers have gained wide acceptance for a wide variety of practical uses because of their good physical properties and their excellent thermal properties.

Despite the otherwise excellent physical properties and superior dimensional stability which have qualified polysulfone resins for many exacting engineering applications the tendency of these materials to stress crack in a wide variety of solvent and solvent vapor environments has severely limited their application in many uses. It has been determined that the incorporation of high modulus fiber reinforcements into polysulfone resins provides a dramatic improvement in the stress crack resistance of the polymer. Chopped glass fibers are widely used for this purpose. It would be preferred however, to use asbestos fibers for the production of reinforced polysulfone materials because of their lower cost, ease of production and superior surface characteristics.

The economic requirements for commercial processing and production of polysulfone composites usually require that the melt be exposed to temperatures approaching 400° C. for short periods of time. While this would not present any problem with polysulfone resins, as such, due to their inherent thermal stability quite the opposite is found in the production of composites of polysulfone thermoplastic materials and high surface area, short fibers, particularly chrysotile asbestos and rutile $TiO_2$. Unfortunately, it has been found that composites of polysulfone polymers with asbestos, particularly chrysotile asbestos, cannot be made satisfactorily because of a thermal cross-linking reaction, induced and accelerated by the presence of asbestos fibers. This reaction rapidly degrades the polymer and produces a nonflowable network structure at temperatures as low as 350° C. This clearly demonstrates the pronounced deterioration of properties in polysulfone composites as compared to uncompounded polysulfone resins which generally degrade only gradually above 400° C. Rapid decomposition of the uncompounded polysulfone polymers in air does not begin usually until temperatures approximating 460° C. are reached.

Similarly, the addition of rutile $TiO_2$ whiskers, with fiber dimensions similar to those of well liberated asbestos, to polysulfone is not possible at commercial processing temperatures due to the thermal instability of the resultant mixture which leads to a crosslinked structure at temperatures in excess of 350° C. This phenomena has also been observed when attempting to "Masterbatch" high concentrations of rutile $TiO_2$ pigment with polysulfone.

We have now found that it is possible to stabilize the polysulfone thermoplastic resin by adding small quantities of a divalent non-hydrolyzable metal oxide or sulfide.

In general we have found that non-hydrolyzable divalent metal oxides and sulfides can be added to polysulfone/asbestos and polysulfone/$TiO_2$ fiber composites to effect thermal stabilization without adversely affecting the final mechanical properties of the composite. The metal oxides and sulfides useful as thermal stabilizers in accordance with our invention include the following:

| | |
|---|---|
| CdO | CoS |
| CoO | CuS |
| CuO | FeS |
| FeO | MgS |
| MnO | MnS |
| NiO | NiS |
| PbO | PbS |
| SnO | SnS |
| ZnO | ZnS |
| CdS | |

Certain divalent metal oxides and sulfides such as calcium oxide cannot be used because of a tendency to hydrolyze under processing conditions to the corresponding dihydroxide, $Ca(OH)_2$ in the case of calcium oxide, which are ineffective as thermal stabilizing agents for polysulfone/asbestos composites.

Mercury compounds are undesirable because of their high toxicity. Others such as platinum and palladium oxides are undesirable for economic reasons.

The preferred stabilizing materials are the divalent oxides of zinc and tin (stannous) for reasons of cost and performance.

In general we have found that stabilization can be achieved by the addition of about .2 to about 15 parts metal oxide to every hundred parts of polysulfone/asbestos or polysulfone/$TiO_2$ fiber composite with the preferred range being from about 3 to about 10 parts or a ratio of metal oxide/asbestos of $\frac{1}{7}$ to $\frac{1}{2}$.

While not critical to the efficacy of the stabilizer in this system we have determined that the greater surface area afforded by smaller particle sizes of the metal oxide stabilizers enhances their stabilizing effect. It is preferred therefore that the particle size of the stabilizer be smaller than about $1.0\mu$ with a particle size of $0.1\mu$, the smallest size commercially available, being preferred.

The thermal stabilizers of our invention are effective stabilizers of polysulfone/asbestos composites in any ratio of polysulfone resin to asbestos fiber; however, because of the mechanical properties of the final composite it is preferred that the composite be comprised of from about 2 to about 40% asbestos fiber and from about 98 to about 50% of polysulfone resin. It should be understood however that the thermal stabilizers of our invention are also useful in uncompounded polysulfone resins particularly where for reasons of taste, as for example where polysulfones are used in cooking implements such as coffee pots, it is necessary to eliminate the products of polysulfone resin degradation.

We have also found that rutile pigment, titanium dioxide, can be added to polysulfone/asbestos composites thermally stabilized in accordance with our invention to improve the surface appearance by eliminating or concealing silvery streaks in the surface known as "splash marks." These splash marks tend to occur more frequently in polysulfone/asbestos composites stabilized with metal oxides and although they do not affect the mechanical properties of the composite they are considered a serious beauty defect. Titanium dioxide can be added to the composition for this purpose in amounts preferably not greater than 5 parts per hundred parts of polysulfone/asbestos.

Our invention is generally applicable to the thermal stabilization of all thermoplastic resins which contain divalent sulfone groups. This invention is especially useful for thermal stabilization of linear thermoplastic polyarylene polyether polysulfone polymers having a basis structure composed of recurring units having the formula $$-O-E-O-E'- \qquad (I)$$

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1 - bis - (4 - hydroxyphenyl) - 2 - phenylethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—CO—), sulfide (—S—), sulfone (—SO$_2$—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —SO$_2$—,
and divalent organic hydrocarbon radicals such as alkylene, alkylidene, cycloaliphatic, or the halogen, alkyl, aryl or like substituted alkylene, alkylidene and cycoaliphatic radicals as well as alkylicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenyl-methane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)-propane,
2,2-bis-(4-hydroxynaphthyl)-propane,
2,2-bis(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropropane and the like;

Di(hydroxyphenyl)sulfones such as bis-(4-hydroxyphenyl)-sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

Di(hydroxyphenyl)ethers such as bis-(4-hydroxyphenyl)-ether,
the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compound, fluorine and chlorine substituted benzenoid reactants being preferred.

Any electron withdrawing group can be employed as the activator group in the dihalobenzenoid compounds. Preferred are the strong activating groups such as the sulfone group ($-SO_2-$) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12,1 (1958).

The electron withdrawing group of the dihalobenzenoid compound can function either through the resonance of the aromatic ring, as indicated by those groups having a high sigma* value, i.e. above about $+0.7$ or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) Monovalent groups that activate one or more halogens on the same ring as a nitro group, phenylsulfone, or alkylsulfone, cyano, trifluoromethyl, nitrose, and hetero nitrogen as in pyridine.

(b) Divalent groups which can activate displacement of halogens on two different rings, such as the sulfone group $-SO_2-$; the carbonyl group $-CO-$; the vinyl group $-CH=CH-$; the sulfoxide group $-SO-$; the azo group $-N=N-$; the saturated fluorocarbon groups $-CF_2-CF_2-$; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

It will be appreciated that for the purposes of this invention either or both the E and E' moieties must include a divalent sulfone grouping.

From the foregoing it is evident that preferred linear thermoplastic polyarylene polyethers are those wherein E is the residuum of a dinuclear dihydric phenol and E' in the residuum of a dinuclear benzenoid compound.

These preferred polymers then are composed of recurring units having the formula

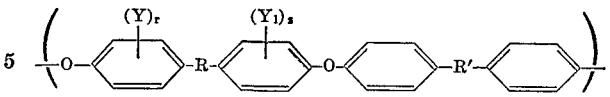

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic polyarylene polyethers of the above formula wherein r and z are zero, R is divalent connecting radical $R''-C-R''$ wherein R'' represents a member of the group consisting of hydrogen, lower alkyl, lower aryl, and the halogen substituted groups thereof, and R' is a sulfone group. It is to be understood that the polymers useful in the practice of our invention are those in which either or both R and R' either are or include a divalent sulfone group.

Thermoplastic polyarylene polyethers described herein can be prepared as described in U.S. Patent 3,264,536, issued Aug. 2, 1966, which is incorporated herein by reference by a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared as described in Example 1 hereof and in the aforementioned U.S. patent in a two-step process in which a dihydric phenol is first converted in situ in a primary reaction solvent to the alkali metal salt by the reaction with the alkali metal, the alkali metal hydride alkali metal hydroxide, alkali metal alkoxide or the alkali metal alkyl compounds.

Thermoplastic polyarylene polyethers (Formula I) as described herein are characterized by high molecular weights indicated by reduced viscosity in indicated solvents. For purposes of the present invention, it is preferred that thermoplastic polyarylene polyethers (Formula I) have reduced viscosity above about 0.5 and most preferably above about 0.65.

The preferred polysulfone polymers for the practice of this invention are those composed of repeating units of the following structure:

Resin A

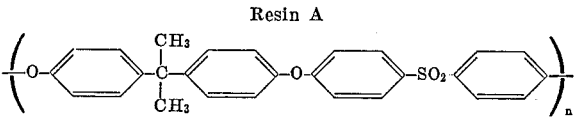

Resin B

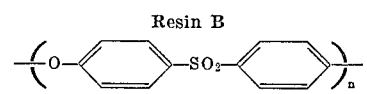

Resin A is a commercially available composition sold under the trade designation P-1700 by Union Carbide Corporation, New York, N.Y. Resin B can be prepared by the reaction of bis (4-chlorophenyl)-sulfone and the dipotassium salt of bis(4-hydroxyphenyl)sulfone as described above as well as by other reactions reported in the literature.

The thermally stabilized polysulfone/asbestos of our invention are conveniently prepared by blending the ingredients and extruding them from a conventional melt extruder. The preferred temperature for the melt is approximately 375° C.

The thermal instability of polysulfone/chrysotile asbestos composites is illustrated by the standard melt index data presented in Table I below.

TABLE I.—MELT STABILITY OF RESIN A WITH VARIOUS ASBESTOS FILLERS AT 375° C.

| Composition | Preheat time, min. | Melt index,[1] dg./min. 1P | 10P |
|---|---|---|---|
| 100% Resin A | 10 | 22 | 233 |
| | 30 | 17 | 250 |
| 15% RG–101,[2] 85% Resin A | 10 | 8.6 | 158 |
| | 30 | 0 | 0 |
| 15% RG–144,[2] 85% Resin A | 10 | 4.4 | |
| | 30 | 0 | 0 |
| 15% RG–244,[2] 85% Resin A | 10 | 8.5 | 308 |
| | 30 | 0 | 0 |
| 15% RG–444,[2] 85% Resin A | 10 | 5.9 | 126 |
| | 30 | 0 | 0 |
| 15% CCM, 4T–1,[3] 85% Resin A | 10 | 6.2 | |
| | 30 | 3.8 | 165 |
| 15% Plastibest,[3] 85% Resin A | 10 | 4.5 | |
| | 30 | 3.7 | 121 |

[1] Melt index is a comparative test with "IP" representing a standard pressure which in this experiment approximates three atmospheres.
[2] Chrysotile asbestos, Coalinga, California deposit.
[3] Canadian chrysotile asbestos, Quebec deposits.

In Table I, it can be seen that unfilled Resin A has a stable melt flow over the 30 minute test period at 375° C. To the contrary, Resin A composites with chrysotile asbestos from both Canadian and California deposits show substantial decreases in melt flow after 30 minutes at 375° C.

As indicated in Table I, the thermal instability problem is especially severe when using chrysotile from the Coalinga, Calif. deposit. Complete crosslinking of the melt occurs in less than 30 minutes and the material will not flow. This material, being the mineral chrysotile, is identical in mineralogical composition to chrysotile mined in various parts of Canada. Coalinga chrysotile differs from Quebec chrysotile only in that its surface area is from 3 to 5 times greater. It is generally recognized that the surface area of commercially available chrysotiles is a function of the amount of mechanical processing to which the material has been subjected as well as the origin of the deposit. It is believed that the differences in melt stability between Coalinga and Quebec chrysotiles, indicated in Table I, can be explained by the degree of fiber liberation in the chrysotiles used.

The desirability of employing high surface area, well liberated chrysotile for producing polysulfone composites is illustrated by Table II below, which compares the mechanical properties of long fiber and short fiber chrysotile asbestos composites.

TABLE II.—MECHANICAL PROPERTIES OF RESIN A/ASBESTOS COMPOSITES

| | Sample number | |
|---|---|---|
| | 1 | 2 |
| Composition | 15% RG–101, 85% Resin A | 15% 4T–1, 85% Resin A |
| Tensile strength ×10⁻⁴, p.s.i. | 1.24 | 1.25 |
| Percent elongation | 6.4 | 4.3 |
| Tensile modulus ×10⁻⁵, p.s.i. | 8.4 | 7.4 |
| Flexural modulus ×10⁻⁵, p.s.i. | 9.7 | 6.6 |
| Flexural strength ×10⁻⁴, p.s.i. | 2.1 | 2.0 |
| Notched Izod | 1.3 | 1.1 |

Samples used in this experiment were compounded in laboratory extruders at 300° C. and ram injection molded. The RG–101 Coalinga chrysotile composition clearly has superior overall mechanical properties due, in large part, to improved fibril liberation. The physical form of RG–101, being short fiber, high surface area chrysotile, also allows direct feeding with powder conveying devices to the processing equipment. Improved molded surface appearance is also apparent when RG–101 is used in polysulfone composites.

These considerations cause the RG–101 type materials to be the preferred asbestos reinforcement for polysulfone. This invention is not however, limited to RG–101 asbestos nor to chrysotile asbestos derived from any particular mineral deposit but is applicable to any chrysotile asbestos which causes thermal instability when compounded with polysulfone resin systems at elevated temperatures.

Table III below is provided to illustrate the influence on the melt index of a typical polysulfone/asbestos composite achieved by adding varying amounts of thermal stabilizer, which in this experiment is ZnO.

TABLE III.—MELT INDEX RESULTS AT 375° C. FOR RESIN A/RG–101 AND FOR RESIN B/RG101 COMPOSITES STABILIZED WITH ZINC OXIDE

| Composition | Preheat time, min. | Melt index, dg./min. 1P | 10P |
|---|---|---|---|
| 15% RG–101, 85% Resin A | 10 | 8.6 | 158 |
| | 30 | 0 | 0 |
| 84% Resin A, 15% RG–101, 1% ZnO | 10 | 5.3 | 150 |
| | 30 | 1.6 | 250 |
| 83% Resin A, 15% RG–101, 2% ZnO | 10 | 6.1 | 220 |
| | 30 | 3.3 | 375 |
| 82% Resin A, 15% RG–101, 3% ZnO | 10 | 5.1 | |
| | 30 | 5.0 | 360 |
| 80% Resin A, 15% RG–101, 5% ZnO | 10 | 4.7 | |
| | 30 | 4.1 | 310 |
| 77% Resin A, 15% RG–101, 8% ZnO | 10 | 6.1 | |
| | 30 | 4.2 | 507 |
| 98% Resin A, 2% ZnO | 10 | 17.0 | 314 |
| | 30 | 18.3 | 264 |
| 15% RG–101, 85% Resin B | 10 | 2.2 | |
| | 30 | 0 | 0 |
| 15% RG–101, 80% Resin B, 5% ZnO | 10 | 4.2 | |
| | 30 | 1.1 | 82.4 |

As shown in Table III, approximately 3% zinc oxide is sufficient to stabilize the melt flow of a 15% RG–101/85% Resin A composite melt for 30 minutes at 375° C. Further addition of zinc oxide to the 8% level does not cause further increase in the composite melt index at 1P, although there is some increase in the 10P values with increasing zinc oxide concentrations.

The effect of zinc oxide on the physical properties of 15% RG–101/85% Resin A composites is shown by Table IV, below.

TABLE IV.—EFFECT OF ZINC OXIDE ON PHYSICAL PROPERTIES OF 15% RG–101 ASBESTOS FILLED RESIN A COMPOSITES

| Sample number | 1 | 2 | 3 |
|---|---|---|---|
| Percent zinc oxide | 0 | 2 | 5 |
| Tensile strength ×10⁻⁴, p.s.i. | 1.24 | 1.22 | 1.26 |
| Percent elongation | 6.4 | 5.5 | 5.4 |
| Tensile modulus ×10⁻⁵, p.s.i. | 8.4 | 8.2 | 8.6 |
| Flexural strength ×10⁻⁴, p.s.i. | 2.1 | 1.8 | 2.1 |
| Flexural modulus ×10⁻⁵, p.s.i. | 9.7 | 7.7 | 7.5 |
| Izod impact | 1.3 | 1.1 | 1.3 |

The addition of up to 5% by weight zinc oxide has relatively little effect on the final composite properties. Tensile modulus and strength are slightly enhanced, flexural modulus and elongation slightly decreased, and notched Izod values virtually unchanged as the zinc oxide concentration is increased to 5%.

Table V below is illustrated of the influence of various other thermal stabilizers on the melt stability of a typical Resin A/asbestos composite.

TABLE V.—EFFECT OF VARIOUS METAL SALTS AND OXIDES ON THE MELT STABILITY 15% RG–101 ASBESTOS FILLED RESIN A COMPOSITES

| Composition: | Preheat time, min. | Melt index 1P | 10P |
|---|---|---|---|
| 3% ZnS | 10 | 5.8 | |
| | 30 | 1.7 | 640 |
| 3% CdO | 10 | 1.1 | |
| | 30 | 1.1 | 531 |
| 5% PbO | 10 | 3.2 | |
| | 30 | 5.7 | 250 |
| 1% SnO | 10 | 6.5 | |
| | 30 | 4.7 | 540 |

Table VI below provides comparative physical data of a typical Resin A/asbestos composite including ZnO as the thermal stabilizer and $TiO_2$ as an antisplash agent as compared to a typical 20% fiberglass/80% Resin A composite.

TABLE VI.—A COMPARISON OF THE PHYSICAL PROPERTIES OF GLASS AND ASBESTOS FILLED POLYSULFONE

| | Sample number | |
|---|---|---|
| | 1 | 2 |
| Composition | 3% TiO₂, 5% ZnO 15% RG-101, 77% Resin A | 20% fiberglass, 80% Resin A |
| Tensile strength, p.s.i. | 14,800 | 14,500 |
| Tensile modulus, p.s.i. | 840,000 | 973,000 |
| Percent elongation | 4.0 | 2.0 |
| Flexural strength, p.s.i. | 24,000 | 21,400 |
| Flexural modulus, p.s.i. | 820,000 | 880,000 |
| Notched Izod | 1.6 | 1.2 |
| Heat distort. temp. (264 p.s.i.), °C | 180 | |
| Lin. coef. of thermal expansion ×10⁻⁵, 1/°C | 2.3–2.6 | |
| Density, g./cc | 1.41 | |

A comparison of the physical properties for the physical properties of glass and asbestos filled polysulfone composites as shown by Table VI indicates a high degree of similarity between the two composites. The stabilized asbestos/polysulfone composite is equal or better than glass/polysulfone composite with respect to significant physical properties.

The thermal instability of polysulfone/rutile whisker composites is illustrated by the melt index data presented in Table VII below.

TABLE VII.—MELT STABILITY OF RESIN A WITH RUTILE FIBERS AT 375° C.

| Composition | Preheat time, min. | Melt index 1P | 10P |
|---|---|---|---|
| 100% Resin A | 10 | 22 | 233 |
| | 30 | 17 | 250 |
| 80% Resin A, 20% AR | 10 | 0.215 | 0.090 |
| | 30 | 0 | 0 |
| 80% Resin A, 20% PH-1 | 10 | 11.2 | |
| | 30 | 1.1 | 9.9 |
| 70% Resin A, 30% PT-3 | 10 | 8.76 | |
| | 30 | 1.05 | 0 |

AR, PT-3, and PH-1 are various fibrous forms of rutile single crystal whiskers which differ primarily in fiber geometry. As has already been illustrated in the case of polysulfone/asbestos composite melts, polysulfone rutile composites are similarly unstable at commercial processing temperatures and show substantial decreases in melt flow after 30 minutes at 375° C. As is the case with polysulfone/asbestos composites the severity of thermal degradation leading to crosslinking seems proportional to the amount of available filler surface area.

The same thermal stabilizers which are used to stabilize the polysulfone/asbestos composites are also effective for stabilizing the melt viscosity of polysulfone/rutile whisker composites as illustrated in VIII for the case: polysulfone, AR whiskers and zinc oxide.

TABLE VIII.—MELT INDEX RESULTS AT 375° C. FOR RESIN A/AR COMPOSITE STABILIZED WITH ZINC OXIDE

| Composition | Preheat time, min. | Melt index 1P | 10P |
|---|---|---|---|
| 20% AR, 80% Resin A | 10 | 0.215 | 0.090 |
| | 30 | 0 | 0 |
| 20% AR, 0.5% ZnO, 79.5% Resin A | 10 | 13.3 | |
| | 30 | 15.2 | 284 |
| 20% AR, 2% ZnO, 78% Resin A | 10 | 14.3 | |
| | 30 | 14.7 | 289 |
| 20% AR, 4% ZnO, 76% Resin A | 10 | 15.6 | |
| | 30 | 14.9 | 296 |
| 60% ZnO, 20% AR, 74% Resin A | 10 | 13.9 | |
| | 30 | 14.3 | 256 |

As shown in Table VIII, approximately 0.5% zinc oxide is sufficient to stabilize the melt flow of a 20% AR/80% Resin A composite melt for 30 minutes at 375° C. Further addition of zinc oxide does not cause a further increase in the melt flow during the test period.

The effect of zinc oxide on the mechanical properties of polysulfone/AR composites is illustrated in Table IX, below.

TABLE IX.—EFFECT OF ZINC OXIDE ADDITION ON MECHANICAL PROPERTIES OF AR/RESIN A COMPOSITES

| Composition | Tensile strength ×10⁻⁴, p.s.i. | Percent elongation | Elastic modulus ×10⁻⁵, p.s.i. | Flexural Strength ×10⁻⁴, p.s.i. | Flexural Modulus ×10⁻⁵, p.s.i. | Izod Impact, ft.-lbs./in |
|---|---|---|---|---|---|---|
| 20% AR, 80% Resin A | 1.30 | 3.9 | 7.8 | 2.2 | 7.5 | 1.3 |
| 20% AR, 2% ZnO, 78% Resin A | 1.41 | 5.3 | 8.5 | 2.3 | 7.6 | 1.3 |
| 20% AR, 4% ZnO, 76% Resin A | 1.42 | 4.9 | 8.9 | 2.3 | 8.4 | 1.4 |
| 20% AR, 6% ZnO, 74% Resin A | 1.42 | 4.5 | 8.8 | 2.2 | 8.6 | 1.4 |

As is the case for polysulfone/asbestos composites, the addition of up to 6% by weight zinc oxide has relatively little effect on the final mechanical properties of the polysulfone/AR composite. All properties are somewhat enhanced by the addition of 2% zinc oxide as compared to the properties without the stabilizer, but further enhancement by addition of larger amounts of zinc oxide is small.

While the foregoing description has dealt primarily with the thermal instability problem which occurs when preparing rutile fiber/polysulfone compositions at commercial processing temperatures, it should be recognized that commonly used $TiO_2$ whitening pigments are also of the rutile form and consequently any thermal instability problems, occurring when using high $TiO_2$ pigment concentrations in polysulfone, may also be effectively resolved by addition of nonhydrolyzable divalent metal oxides such as zinc oxide.

Table X below is a comparison of the environmental stress cracking resistance properties of unfilled and asbestos filled polysulfone composites exposed to various chemicals.

TABLE X

| | Composition | | | |
|---|---|---|---|---|
| | Unfilled Resin A | | 15% RG-101 asbestos, 5% ZnO, 80% Resin A | |
| | Time to rupture | | | |
| Stress | 500 p.s.i. | 1,000 p.s.i. | 1,250 p.s.i. | 2,500 p.s.i. |
| Chemical: | | | | |
| Xylene | 1'45" | 11" | >3'N.R. | 2'5" |
| Acetone | 1' | I.R. | 1' | 5" |
| MEK | I.R. | I.R. | >3'N.R. | 5" |
| Ethyl acetate | 8" | I.R. | >3'N.R. | 23" |
| GF-4000 | >3'N.R. | 1'30" | >3'N.R. | 3'N.R. |
| Toluene | 30" | 3" | >3'N.R. | 6" |

These tests were conducted on bent bars using 0.125 inch thick injection molded flex bars. "I.R." indicates instant rupture. "N.R." indicates no rupture during the test period. Unfilled Resin A tested at relatively low stresses of 500 and 1000 p.s.i. was markedly inferior to asbestos filled polysulfone exposed to stresses of 1250 and 2500 p.s.i. The values obtained for asbestos filled Resin A at 2500 p.s.i. are roughly equal to those obtained for the unfilled polymer at 500 p.s.i. indication at five fold increase in resistance to environmental stress cracking.

What is claimed is:

1. A thermally stabilized composition comprising a thermoplastic polyarylene polyether polysulfone resin and an effective amount of a non-hydrolyzable divalent metal oxide or sulfide as a thermal stabilizing agent.

2. A composition according to claim 1 wherein said metal is zinc.

3. A thermally stabilized composition comprising a mixture of thermoplastic polyarylene polyether polysulfone resin; asbestos and a non-hydrolyzable divalent metal oxide or sulfide.

4. A composition according to claim 3 wherein said thermally stabilized composition is comprised of from about 2 to about 40 percent by weight asbestos; from about .2 to about 15 percent by weight of said thermal stabilizing agent; from about 97.8 to about 50 percent by weight of said resin and from 0 to about 5 percent by weight titanium dioxide.

5. A composition according to claim 4 wherein said thermal stabilizing agent is a divalent oxide or sulfide of zinc.

6. A composition according to claim 4 wherein the particle size of said thermal stabilizing agent is less than 1 micron in diameter.

7. A composition according to claim 4 wherein said resin is composed of repeating units having the following structure:

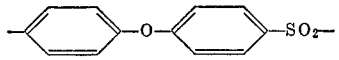

8. A thermally stable composition comprising a mixture of from about 5 to about 30 percent by weight asbestos, from 0 to about 5% by weight titanium dioxide, from about 92 to about 60 percent by weight of a thermoplastic resin composed of recurring units having the following structure:

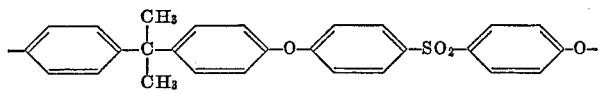

and from about 3 to about 10 percent by weight of ZnO.

9. A composition according to claim 4 wherein said resin is composed of repeating units having the following structure:

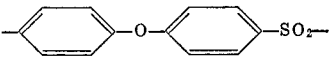

10. A composition according to claim 1 wherein the thermally stabilized composite composition is comprised of a mixture of polyarylene polyether polysulfone resin, a non-hydrolyzable divalent metal oxide or sulfide, and rutile $TiO_2$ in either a particulate or fiber form.

11. A composition according to claim 10 wherein the thermally stabilized composition is comprised of from about 1 to 40 percent by weight fibrous or spherical particle rutile, from about 0.1 to about 10% by weight of said thermal stabilizing agent; from about 98.9 to 50 percent by weight of said resin.

12. A composition according to claim 4 wherein said resin is composed of repeating units having the following structure:

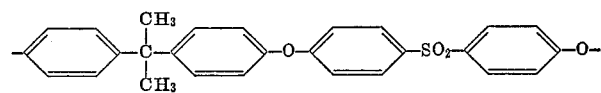

13. A thermally stabilized composition comprising a high molecular weight linear polyarylene polyether polysulfone resin and an effective amount of a non-hydrolyzable divalent metal oxide or sulfide as a thermal stabilizing agent.

14. A composition according to claim 12 wherein said metal is zinc.

15. A thermally stabilized composition comprising a mixture of a high molecular weight linear polyarylene polyether polysulfone resin, asbestos and a non-hydrolyzable divalent metal oxide or sulfide.

References Cited

UNITED STATES PATENTS

| | | | |
|---|---|---|---|
| 3,287,329 | 11/1966 | Slovinsky | 260—45.75 K |
| 3,579,475 | 5/1971 | Jones et al. | 260—37 R |
| 3,409,599 | 11/1968 | Bauer et al. | 260—45.75 R |

OTHER REFERENCES

Brydson: Plastics Materials, Iliffe Books Ltd., 1966, pp. 334–5.

LEWIS JACOBS, Primary Examiner

U.S. Cl. X.R.

260—45.7, 45.75 K, 45.75 N, 45.75 C